United States Patent
Mayer et al.

(10) Patent No.: US 11,203,166 B2
(45) Date of Patent: Dec. 21, 2021

(54) SECURING A SECOND OBJECT TO A FIRST OBJECT

(71) Applicant: Woodwelding AG, Stansstad (CH)

(72) Inventors: Jörg Mayer, Niederlenz (CH); Joakim Kvist, Grenchen (CH)

(73) Assignee: WOODWELDING AG, Stansstad (CH)

(*) Notice: Subject to any disclaimer, the term of this patent is extended or adjusted under 35 U.S.C. 154(b) by 412 days.

(21) Appl. No.: 15/578,381

(22) PCT Filed: Jun. 9, 2016

(86) PCT No.: PCT/EP2016/063210
§ 371 (c)(1),
(2) Date: Nov. 30, 2017

(87) PCT Pub. No.: WO2016/198546
PCT Pub. Date: Dec. 15, 2016

(65) Prior Publication Data
US 2018/0215105 A1 Aug. 2, 2018

(30) Foreign Application Priority Data
Jun. 11, 2015 (CH) .................................. 00838/15

(51) Int. Cl.
*B29C 65/08* (2006.01)
*B29C 65/60* (2006.01)
(Continued)

(52) U.S. Cl.
CPC ............ *B29C 65/603* (2013.01); *B29C 65/08* (2013.01); *B29C 66/0222* (2013.01);
(Continued)

(58) Field of Classification Search
CPC ..... B29C 65/08; B29C 65/603; B29C 66/472; B29C 66/723; B29C 66/83; F16B 5/01
(Continued)

(56) References Cited

U.S. PATENT DOCUMENTS 3,287,195 A * 11/1966 Piazze ................. B29C 65/7437
156/251
3,562,699 A 2/1971 Branden et al.
(Continued)

FOREIGN PATENT DOCUMENTS

CN 102256766 11/2011
DE 100 25 360 10/2001
(Continued)

OTHER PUBLICATIONS

Timmermann et al., English machine translation of DE102012003737, Aug. 29, 2013 (Year: 2013).*
(Continued)

*Primary Examiner* — Jacob T Minskey
(74) *Attorney, Agent, or Firm* — Rankin, Hill & Clark LLP

(57) ABSTRACT

A method of bonding a second object to a first object includes: providing the first object, which includes a thermoplastic liquefiable material in a solid state; providing the second object, which includes a surface portion that has a coupling structure with an undercut such that the second object can make a positive-fit connection with the first object; and pressing the second object against the first object with a tool that is in physical contact with a coupling-in structure of the second object while mechanical vibrations are coupled into the tool. The step of pressing and coupling vibrations into the tool continues until a flow portion of the thermoplastic material of the first object is liquefied and flows into the coupling structures of the second object.
(Continued)

Thereafter, the thermoplastic material of the first object is permitted to re-solidify to yield a positive-fit connection between the first and second objects.

35 Claims, 7 Drawing Sheets

(51) Int. Cl.

| | | |
|---|---|---|
| *B29C 65/00* | (2006.01) | |
| *F16B 5/04* | (2006.01) | |
| *F16B 5/01* | (2006.01) | |
| *F16B 3/00* | (2006.01) | |
| *B29C 65/74* | (2006.01) | |
| *B29C 65/06* | (2006.01) | |
| *F16B 17/00* | (2006.01) | |
| *B29K 101/12* | (2006.01) | |
| *B29K 105/00* | (2006.01) | |
| *B29L 9/00* | (2006.01) | |
| *B29L 31/30* | (2006.01) | |

(52) U.S. Cl.
CPC .... *B29C 66/02242* (2013.01); *B29C 66/1122* (2013.01); *B29C 66/3022* (2013.01); *B29C 66/30321* (2013.01); *B29C 66/30325* (2013.01); *B29C 66/472* (2013.01); *B29C 66/474* (2013.01); *B29C 66/721* (2013.01); *B29C 66/723* (2013.01); *B29C 66/7254* (2013.01); *B29C 66/72525* (2013.01); *B29C 66/7392* (2013.01); *B29C 66/742* (2013.01); *B29C 66/81427* (2013.01); *B29C 66/8322* (2013.01); *B29C 66/92445* (2013.01); *B29C 66/92921* (2013.01); *B29C 66/9517* (2013.01); *F16B 3/005* (2013.01); *F16B 5/01* (2013.01); *F16B 5/04* (2013.01); *B29C 65/06* (2013.01); *B29C 65/7437* (2013.01); *B29C 66/71* (2013.01); *B29C 66/727* (2013.01); *B29C 66/7212* (2013.01); *B29C 2793/0045* (2013.01); *B29K 2101/12* (2013.01); *B29K 2105/253* (2013.01); *B29L 2009/003* (2013.01); *B29L 2031/30* (2013.01); *F16B 17/008* (2013.01)

(58) Field of Classification Search
USPC .......................................................... 264/443
See application file for complete search history.

(56) References Cited

U.S. PATENT DOCUMENTS

| | | | | |
|---|---|---|---|---|
| 5,361,483 | A | * 11/1994 | Rainville | .......... B29C 66/73921 |
| | | | | 29/524.1 |
| 5,540,808 | A | * 7/1996 | Vincent | ................. F16K 31/004 |
| | | | | 156/580.2 |
| 5,570,152 | A | * 10/1996 | Kaya | ..................... G03B 17/30 |
| | | | | 396/515 |
| 2005/0126680 | A1* | 6/2005 | Aeschlimann | ...... B29C 66/7463 |
| | | | | 156/73.1 |
| 2011/0206448 | A1 | 8/2011 | Clinch et al. | |

FOREIGN PATENT DOCUMENTS

| | | |
|---|---|---|
| DE | 10 2012 003 737 | 8/2013 |
| WO | 93/12344 | 6/1993 |
| WO | 98/42988 | 10/1998 |
| WO | 00/79137 | 12/2000 |
| WO | 2008/080238 | 7/2008 |
| WO | 2015/135824 | 9/2015 |
| WO | 2015/162029 | 10/2015 |

OTHER PUBLICATIONS

Polymer Database, "High Impact Polystyrene (HIPS)", https://polymerdatabase.com/Commercial%20Polymers/PS2.html (Year: 2015).*
International Preliminary Report on Patentability dated Dec. 12, 2017 (Dec. 12, 2017), Application No. PCT/EP2016/063210, 7 pages.
English translation of Chinese Office Action dated Jan. 19, 2020, Application No. 201680033933.8, 7 pages.

* cited by examiner

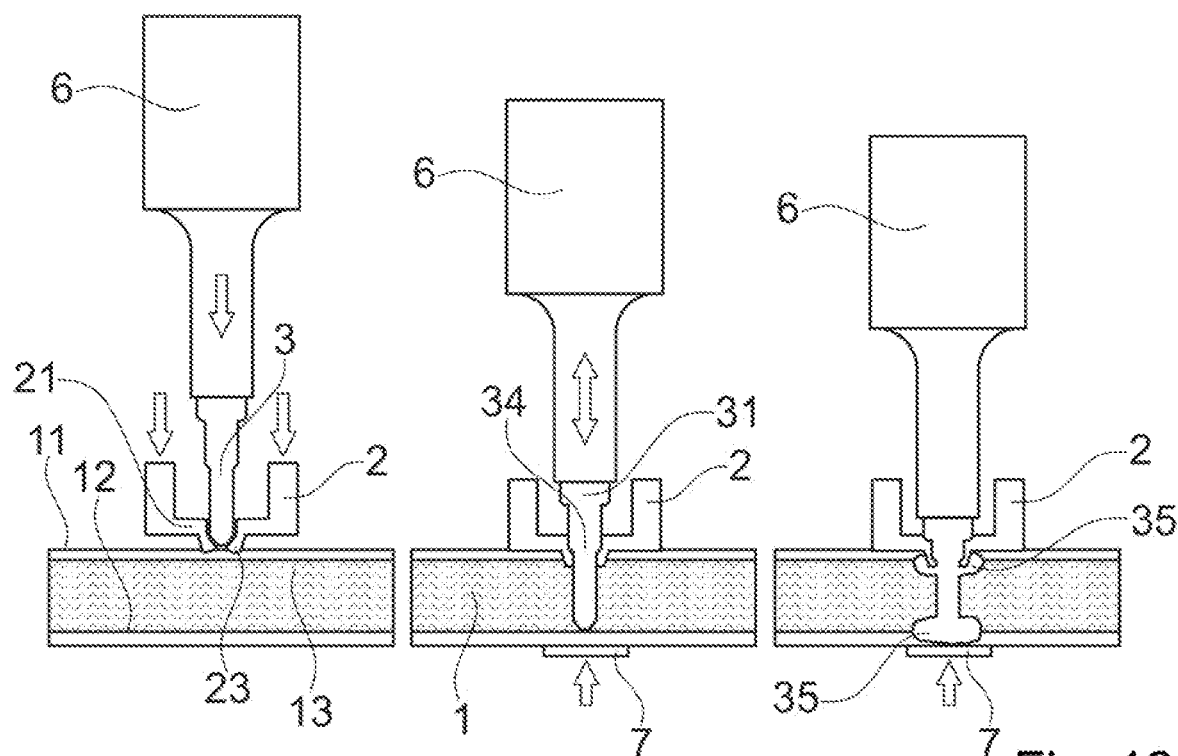
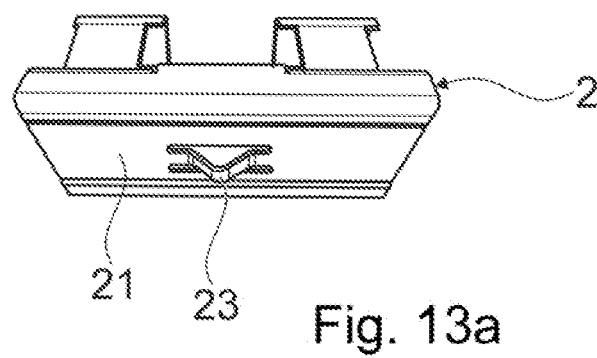
Fig. 13a
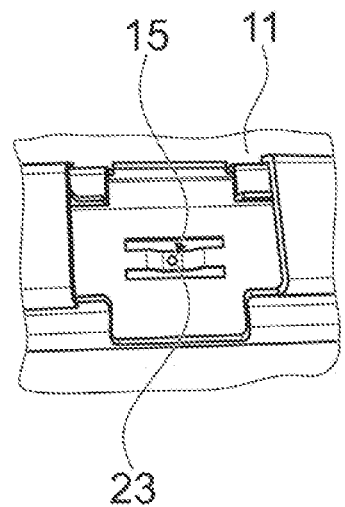
Fig. 13b
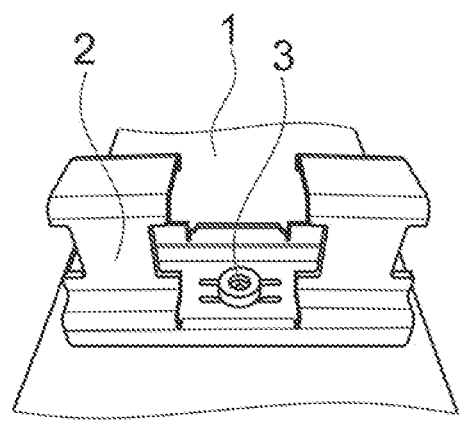
Fig. 13c

SECURING A SECOND OBJECT TO A FIRST OBJECT

BACKGROUND OF THE INVENTION

Field of the Invention

The invention is in the fields of mechanical engineering and construction, especially mechanical construction, for example automotive engineering, aircraft construction, shipbuilding, machine construction, toy construction etc. In particular, it relates to a method of—mechanically—securing a second object to a first object.

Description of Related Art

In the automotive, aviation and other industries, there has been a tendency to move away from steel-only constructions and to instead use lightweight material such as aluminum or magnesium metal sheets or polymers, such as carbon fiber reinforced polymers or glass fiber reinforced polymers or polymers without reinforcement, for example polyesters, polycarbonates, etc.

An example of new building material elements are lightweight building elements that include two outer, comparably thin building layers, for example of a fiber composite, such as a glass fiber composite or carbon fiber composite, a sheet metal or also, depending on the industry, of a fiberboard, and a middle layer (interlining) arranged between the building layers, for example a cardboard honeycomb structure or a lightweight metallic foam or a polymer foam or ceramic foam, etc., or a structure of discrete distance holders. Lightweight building elements of this kind may be referred to as "sandwich boards" and are sometimes called "hollow core boards (HCB)". They are mechanically stable, may look pleasant and have a comparably low weight.

The new materials cause new challenges in bonding elements of these materials—especially in bonding flattish object to an other object. An example for this is the bonding of reinforcements ("stringers" or the like) to flattish sandwich board constructions in the automotive, aviation, shipbuilding and other industries.

To meet these challenges, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond. Also, adhesive bonds may lead to a rise in manufacturing cost, both, because of material cost and because of delays caused in manufacturing processes due to slow hardening processes, especially if the surfaces to be connected to each other have certain roughness and as a consequence the quickly hardening thin-layer adhesives cannot be used.

SUMMARY OF THE INVENTION

It is therefore an object of the present invention to provide a method of mechanically securing a second object to a first object, the method overcoming disadvantages of prior art methods. Especially, it is an object of the present invention to provide a method of mechanically securing a second object to a first object to yield a mechanical bond that is mechanically stable and resistant especially to shearing forces so that the method is suitable for securing reinforcement to a planar object. Further, it is an object of the present invention to provide a method of mechanically securing a second object to a first object, which method has the potential of being low-cost, efficient and quick.

According to an aspect of the invention, a method of mechanically securing a second object to a first object is provided, the method including the steps of:

Providing the first object including an attachment face;
Providing the second object with a generally flat sheet portion;
Providing a connector, the connector including a thermoplastic material in a solid state;
Placing the second object relative to the first object so that the sheet portion lies against the attachment face and a protruding section of the sheet portion extends into an opening of the first object, the opening having a mouth in the attachment face, the protruding section extending through the mouth into the opening;
While the protruding section extends into the opening, causing energy to impinge on the connector while the connector is placed relative to the first and second objects and extends through the mouth into the opening, until a flow portion of the thermoplastic material becomes flowable and flows relative to the first object and relative to the protruding section; and
Causing the flow portion to resolidify;
Wherein the resolidified flow portion locks the protruding section relative to the opening.

The fact that the protruding section extends into the opening may be caused by providing the second object initially with the protruding section and placing the second object relative to the first object so that the protruding section protrudes into a pre-made opening. Alternatively, the protruding section may be generated in situ by deforming the second object accordingly, also while the energy has started to impinge. In both cases, there exist the options that the opening in the first object is pre-made or that the opening in the first object is generated by the protruding section being pressed into material of the first object.

During the step of causing energy to impinge on the connector in most embodiments a pressing force will be applied to the connector. This pressing force may be—directly or indirectly—coupled into the connector by a sonotrode that also couples the energy into the connector, if the energy is mechanical vibration energy. The pressing force together with the fact that the flow portion becomes flowable and possibly together with mechanical deformation (see below) may cause a forward/distal movement of the tool that applies the pressing force, i.e. the sonotrode in the example of the mechanical vibration. The forward/distal movement will cause an according forward/distal movement at least of portions of the connector that are in contact with the tool.

In embodiments, the method includes maintaining the pressing force for some time after the energy input has stopped, until the flow portion has sufficiently re-solidified.

The sheet portion may lie directly against the attachment face and be in physical contact with it. Alternatively, a further part, such as a thin sheet or membrane, may be placed between the attachment face and the sheet portion.

The first object may include a building layer of a dimensionally stable material (such as sheet metal, a composite material, etc.), forming the attachment face, and an interlining or empty space distally thereof (An interlining in this is formed by material with a density and/or mechanical strength that is, for example strongly, inferior to a density/mechanical strength of the building layer.).

The protruding section after the step of placing extends into the opening and through the first (proximal) building layer. The flow portion in the step of flowing flows underneath portions of the building layer. Especially, the first object may be a sandwich board of the hereinbefore discussed kind.

Alternatively, the first object may consist of the building layer and for example be a sheet metal object. Even further alternatives with a building layer and with a comparably soft interlining underneath are possible.

Especially if the first object consist of the building layer or if the building layer otherwise includes a ductile material, the method may further include deforming a part of the building layer to yield a first object protruding section, the first object protruding section protruding on a distal side from a building layer sheet surface. Especially, such deformation may take place together with a deformation yielding the (second object) protruding section.

The attachment face defines an attachment surface of the first object. The attachment surface may be plane but may also have other shapes. For example, it may be curved or have a structure with steps or similar. In a region surrounding the mouth of the opening, it may define a continuous surface, and the protruding section and the connector both extend through the surface during the step of causing energy to impinge and still do so after the flow portion has resolidified.

The method may include the further step of manufacturing the opening in the first object prior to the step of placing the second object relative to the first object, for example by punching, drilling, etc. Alternatively, the opening may be an opening that exists in the first object anyway or has been provided in a manufacturing process. According to yet another alternative, the opening may be caused by placing the second object relative to the first object and/or placing the connector relative to the object, wherein in this step for example the structures of the first object and/or the connector include an accordingly shaped tip or edge or the like and the step includes applying a pressing force. This may be done prior to causing the energy to impinge or simultaneously therewith or both.

Combinations of the different alternatives are possible, for example by punching a curved or angled punching line into the first object in a first step and then deforming a punched-out section of the uppermost layer of the first object by the second object and/or the connector to yield the opening.

The second object may be any object that has a flattish sheet portion. "Sheet portion" in this does not imply a necessarily homogeneous thickness. In most embodiments the sheet portion will have, in a region, a defined distal face (that lies against the attachment face during the process, with a possible further object in-between) and a defined, for example parallel proximal face, so that a sheet portion surface is defined, the protruding section extending away from the sheet portion surface to the distal side, and leaving an opening (the second object opening) for the connector to reach through from the proximal side of the second object to the distal side and into the opening of the first object.

In this, the protruding section is arranged in a vicinity of the second object opening and projects, in a projection perpendicular to the sheet portion surface, projects into the opening so that when the connector is inserted in the opening from the proximal side sufficiently deeply into the opening it will be in (direct or possibly indirect) physical contact with the protruding section. In embodiments, in the step of causing a flow portion of the thermoplastic material to become flowable, the flow portion or parts thereof may become flowable due heat generated between the protruding section and the thermoplastic material. This may especially apply if the impinging energy is mechanical energy, such as mechanical vibration energy, and the heat generated is friction heat.

The protruding section may be a deformed section. Such a deformed section may be formed by deforming a corresponding part of the sheet portion, for example by making a cut (for example by punching) and bending or otherwise deforming hence leaving a second element opening where the corresponding part of the sheet portion had initially been. In this, the deformed section may still be one-piece with the sheet section.

Especially, the protruding section being a deformed section may be of a same metal sheet material as the sheet portion.

The second object, especially the deformed section thereof, may include an energy directing feature. For example, the deformed section may include an energy directing portion bent towards a proximal side so that the connector when brought into contact with the deformed section is initially pressed against the energy directing portion.

An energy directing portion may also serve as flow directing element. A flow directing element may serve for distributing the flow of the flow portion in a targeted manner. By this, for example the flow into a region where high loads can be expected when the assembly is in use, may be reinforced in a targeted manner. In addition or as an alternative, if the strength of the material portions to be penetrated by the flow portion is not equal in all directions, a flow directing structure may influence the flow so that it does not only go to directions where the resistance is particularly small (but for example takes place in a balanced manner).

A flow directing element (flow director) may be formed by an energy directing portion (energy director) and/or may be formed by a separate structure not having any substantial energy directing properties.

A flow director may include one or a combination of the following:
A structure that prevents a flow in a particular lateral direction but does not prevent a flow in another lateral direction. For example, the first object may form a plurality of windows (openings) through which the flow portion may flow laterally/radially away from an insertion axis, with the windows for the different directions being equal or different in size. Or the second object may form a wall preventing flow in one direction but enabling flow in opposite directions (see for example FIGS. 6a and 13 described hereinafter).
A protrusion extending from a ground portion of the deformed section, against which ground portion a distal end of the connector is pressed during the process, towards a proximal side, at least approximately to an axial position corresponding to the axial position of outflow channels (see for example FIG. 19 or FIG. 21 described hereinafter).

The step of causing the flow portion to flow may include causing at least parts of the protruding section to become embedded in material of the flow portion. Embedding does not necessarily imply that the flow portion is fully surrounded. Rather, the flow portion after re-solidification will at least to some extent a deformation (back) of the protruding section. The effect is that when a shearing force acts on the connection between the first and second objects, the protruding section will prevent a relative movement, and the thermoplastic material will prevent a giving way by the protruding section.

An effect of the approach according to the invention is that the achieved connection provides some resistance against axial relative forces on the first and second objects (against forces trying to pull them apart) and provides a very strong resistance against shear forces acting between the first and second objects in that the material of the connector impedes any bending of the protruding section back into its initial position. Even if the thermoplastic material of the connector itself may have a limited mechanical strength, the resistance against such shear forces (in-plane relative forces) may be very strong due to the intrinsic strength of the materials of the first object (or the building layer thereof penetrated by the protruding section) and of the second object and due to the fact that these materials are interlocked in the resulting configuration.

In embodiments, the protruding section being a deformed section may include one or more tabs bent away from the sheet portion surface or may include a closed bow.

Instead of being a deformed section, the protruding section may be configured otherwise, for example by having been produced in a cast process directly to protrude from the sheet portion ab initio.

The connector includes thermoplastic material. In embodiments, the connector consists of thermoplastic material.

In other embodiments, the connector in addition to the thermoplastic material includes a body of a not liquefiable material.

In embodiments with a not liquefiable body, the body of the not liquefiable material is different from a mere filler of a large number of particles but is a macroscopic body with a defined position and orientation and of a substantial size of for example at least 10% of a connector volume, and/or with a characteristic dimension of at least 0.1 mm in any dimension. Especially, the body may be metallic or of ceramics. Especially, the body may be such as to have a defined shape and to thereby add stiffness to the connector. By the body, the connector is defined into at least two spatially separated regions, namely the body region and the thermoplastic region.

Such a body of not liquefiable material may carry structures serving for further functions, such as a thread, an other mechanical connection, a contact or feedthrough, etc.

In embodiments, the body has a surface with at least one locking feature on a lateral surface, which locking feature cooperates with thermoplastic material the body to stabilize the relative position of the body, within embedding thermoplastic material.

In embodiments in which the connector in addition to the thermoplastic material includes not liquefiable material, the thermoplastic material may be arranged at least on surface portions that come into contact with the protruding section and/or with the mouth of the first object. Alternatively, the thermoplastic material may be arranged or arrangeable in an interior, and the body may include a fenestration through which the thermoplastic material may be pressed out to be brought into contact with the protruding section.

In embodiments, the connector during the process of coupling energy into it and thereafter extends through a plane of the sheet portion of the second object from a proximal side thereof. Especially, it may extend through a shear plane between the sheet portion and the attachment face. In case the connector has a body of a not liquefiable material, such as a core, the body may be arranged to extend through the plane of the sheet portion and/or through the shear plane.

Especially, the connector may include a proximal head, a distally facing abutment face of which abuts against the sheet portion in a region around the protruding section.

In addition or as an alternative, the connector may include a step or taper feature, wherein upon pushing the connector into the aligned openings of the second and first objects, the step or taper feature gets into contact with the protruding section and encounters physical resistance against a further pushing in of the connector. In this, at least the step or taper may include the thermoplastic material.

In addition, if the first object includes a sandwich board, during the step of causing energy to impinge on the connector a distal end of the connector may be pushed against an inner surface of the second (distal) building layer. Then, parts of the flow portion may at the distal end, and this may yield an additional anchoring of the connector in structures of the distal building layer and/or structures immediately proximally thereof.

As an even further alternative, during the step of causing energy to impinge on the connector a distal end of the connector may be pushed against the protruding section to make thermoplastic material flowable. Then, at least the distal end of the connector includes the thermoplastic material.

Generally, the connector may be essentially pin shaped or bolt shaped (i.e. have a shaft portion), with the mentioned optional head and/or the step/taper. Then, an axis of the connector is caused to extend approximately perpendicularly to the sheet portion and attachment face. However, the connector does not necessarily have a round cross section. Rather, it may have a different shape, for example elongate, polygonal, T-shaped. H-shaped, U-shaped, etc.

Alternatively, the connector may have a main body (that may serve as a head portion in the above sense) with a generally flat distally facing abutment face and a protruding portion protruding distally from the main body. During the process, it is the protruding portion that extends through the mouth into the opening. The distally facing abutment face may serve as stop face for a movement of the connector relative to the first object caused by the pressing force. After the process, the abutment face may abut against the sheet portion in a region around the protruding section In a group of embodiments, the connector is provided as to include a thermoplastic sheet portion, and the portion of the connector that extends through the mouth into the opening is manufactured in situ, by deforming the sheet portion the effect of the pressing force while the sheet portion lies against the second object and/or the first object. While the pressing force that deforms the sheet portion acts, energy, for example mechanical vibration energy, may impinge.

In a sub-group of these embodiments, the connector and the second object are provided as a unit.

The energy that is applied to the connector may be mechanical energy, such as mechanical vibration energy. To this end, the connector may have a proximal, proximally facing coupling-in face that cooperates with a vibrating object, namely a sonotrode, during the step of causing energy to impinge.

The liquefaction of the flow portion in this is primarily caused by friction between the vibrating second object and the surface of the first object, which friction heats the first object superficially.

In a group of embodiments, the connector and/or a portion of the second and/or first object against which the connector is pressed comprises, at the surface that during the pressing and vibrating is in direct contact with the first object, structures serving as energy directors, such as edges or tips, such as energy directors known from ultrasonic welding or for the "Woodwelding" process such as, for example, described in WO 98/42988 or WO 00/79137 or WO 2008/080 238.

For coupling mechanical vibrations into the connector, the connector may include a coupling-in structure. Such a coupling-in structure may be a coupling-in face, especially, constituted by a proximal-most end face, with or without guiding structures (such as a guiding hole for an according protrusion of the tool), for a separate sonotrode as the tool. In alternative embodiments, the coupling-in structure may include a coupling that couples the second object directly to a vibration generating apparatus, which vibration generating apparatus then serves as a tool for coupling the vibrations into the connector. Such a coupling may for example by a thread or a bayonet coupling or similar. Thus in these embodiments, the second object is at the same time a sonotrode coupled to a vibration generating apparatus.

Other forms of energy are not excluded, for example radiation energy that is coupled in through the connector and absorbed at the interface to the second and/or first object.

The first and second objects are construction components (construction elements) in a broad sense of the word, i.e. elements that are used in any field of mechanical engineering and construction, for example automotive engineering, aircraft construction, shipbuilding, building construction, machine construction, toy construction etc. Generally, the first and second objects as well as the connector will all be artificial, man-made objects. The use of natural material such as wood-based material in the first and/or second object is thereby not excluded. Especially, the second object may be a 'stringer' or other reinforcement mechanically reinforcing the first object (or vice versa).

The flow portion of the thermoplastic material is the portion of the thermoplastic material that during the process and due to the effect of the mechanical vibrations is caused to be liquefied and to flow. The flow portion does not have to be one-piece but may include parts separate from each other, for example at the distal end of the connector and at a more proximal place.

For applying a counter force to the pressing force, the first object may be placed against a support, for example a non-vibrating support. According to a first option, such a support may include a supporting surface vis-à-vis the spot against which the connector is pressed, i.e. distally of this spot. This first option may be advantageous because the bonding can be carried out even if the first object by itself does not have sufficient stability to withstand the pressing force without substantial deformation or even defects. However, according to a second option, the distal side of the first object may be exposed, for example by the first object being held along the lateral sides or similar. This second option features the advantage that the distal surface will not be loaded and will remain unaffected if the second object does not reach to the distal side.

In embodiments, the first object is placed against a support with no elastic or yielding elements between the support and the first object, so that the support rigidly supports the first object.

In a group of embodiments, the first object includes a portion of a material that is penetrable by the thermoplastic material. Therein, in the step of causing the flow portion to flow includes causing material of the flow portion to penetrate into the penetrable portion, whereby, after re-solidification, a positive-fit connection between the connector and the first object is achieved.

A penetrable material suitable for this is solid at least under the conditions of the method according to the invention. It further includes (actual or potential) spaces into which the liquefied material can flow or be pressed for the anchoring. It is, e.g., fibrous or porous or includes penetrable surface structures which are, e.g., manufactured by suitable machining or by coating (actual spaces for penetration). Alternatively the penetrable material is capable of developing such spaces under the hydrostatic pressure of the liquefied thermoplastic material, which means that it may not be penetrable or only to a very small degree when under ambient conditions. This property (having potential spaces for penetration) implies, e.g., inhomogeneity in terms of mechanical resistance. An example of a material that has this property is a porous material whose pores are filled with a material which can be forced out of the pores, a composite of a soft material and a hard material or a heterogeneous material in which the interfacial adhesion between the constituents is smaller than the force exerted by the penetrating liquefied material. Thus, in general, the penetrable material includes an inhomogeneity in terms of structure ("empty" spaces such as pores, cavities etc.) or in terms of material composition (displaceable material or separable materials).

In the example of a sandwich board with glass fiber composite building layers and an interlining between them, the penetrable material may for example be constituted by a foaming adhesive, such as a PU adhesive, between the building layers and the interlining, and/or by the interlining that itself may include spaces/pores.

In this text the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction i.e. when arranged at one of a pair of surfaces (contact faces) being in contact with each other and vibrationally moved relative to each other, wherein the frequency of the vibration has the properties discussed hereinbefore. In some situations, for example if the first object itself has to carry substantial loads, it may be advantageous if the material has an elasticity coefficient of more than 0.5 GPa. In other embodiments, the elasticity coefficient may be below this value, as the vibration conducting properties of the first object thermoplastic material do not play a role in the process.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibres or particles of material which has no thermoplastic properties or has thermoplastic properties including a melting temperature range which is considerably higher than the melting temperature range of the basic polymer.

In this text, generally a "non-liquefiable" material is a material that does not liquefy at temperatures reached during the process, thus especially at temperatures at which the thermoplastic material of the connector is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature in this text") is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

For example, the non-liquefiable material may be a metal, such as aluminum or steel, or wood, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C. or 100° C.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for embodiments of the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode) is e.g. designed such that its contact face oscillates predominantly in the direction of the tool axis (longitudinal vibration) and with an amplitude of between 1 and 100 µm, preferably around 30 to 60 µm. Such preferred vibrations are e.g. produced by ultrasonic devices as e.g. known from ultrasonic welding.

In this text, the terms "proximal" and "distal" are used to refer to directions and locations, namely "proximal" is the side of the bond from which an operator or machine applies the mechanical vibrations, whereas distal is the opposite side. A broadening of the connector on the proximal side in this text is called "head portion", whereas a broadening at the distal side is the "foot portion".

In this text, generally the term "underneath" a layer is meant to designate a space distally of this layer if the proximal side being defined to be the side of the layer from which it is accessed during the process. The proximal side of the first object is the side to which the attachment face faces, "underneath" refers to the opposite side of the building layer. The term "underneath" thus is not meant to refer to the orientation in the earth gravity field during the manufacturing process.

BRIEF DESCRIPTION OF THE DRAWINGS

In the following, ways to carry out the invention and embodiments are described referring to drawings. The drawings, with the possible exception of photographs, are schematical. In the drawings, same reference numerals refer to same or analogous elements. The drawings show:

FIG. 12 a configuration of a first object, a second object and a connector during three different stages of a process of securing the second object to the first object, wherein the second object is a metal frame;

FIG. 13a an image of an example of a second object with a closed protruding section;

FIGS. 13b and 13c images of the second object of FIG. 13a placed relative to a first object, prior to and after anchoring a connector to secure the second object to the first object;

FIG. 14, schematically, a configuration with a second object as shown in FIG. 13a;

DETAILED DESCRIPTION OF THE INVENTION

Figure 1A:
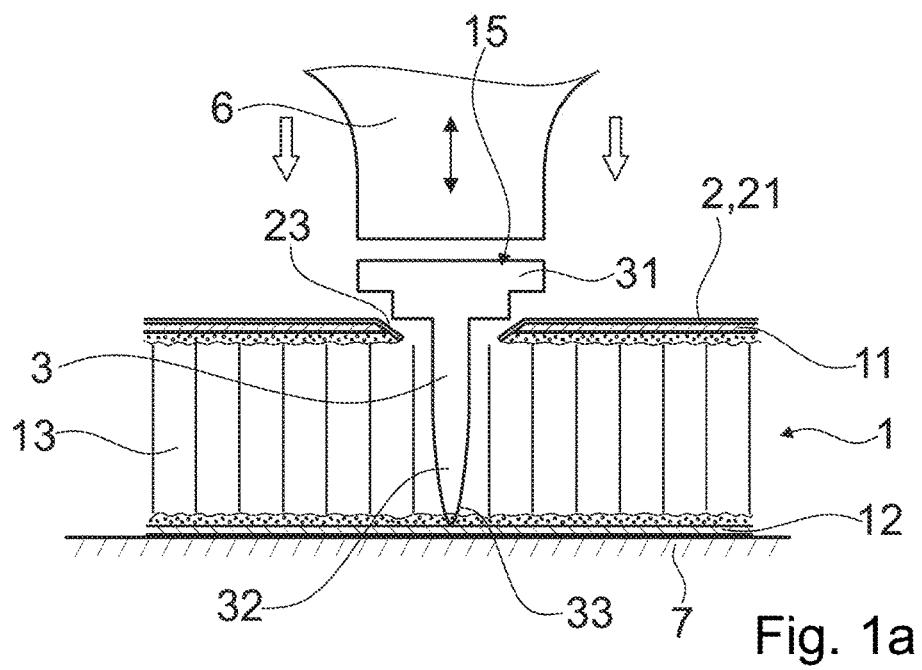
FIGS. 1a-1c a configuration of a first object, a second object and a connector during two different stages of a process of securing the second object to the first object, and a detail.

The configuration of FIG. 1a includes a first object 1 being a sandwich board with a first building layer 11, a second building layer 12, and an interlining 13 between the building layers. The first and second building layers may include a fiber composite, such as a continuous glass or continuous carbon fiber reinforced resin. The interlining may be any suitable lightweight material, for example a honeycomb structure of cardboard. An additional adhesive may bond the building layers 11, 12 to the interlining. In an example a slightly foaming adhesive on polyurethane basis is used. Possible pores in the adhesive may contribute to the anchoring in the various embodiments of the invention. The face that in the depicted orientation is the upper face serves as attachment face for the second object 2.

The first object includes an opening 15 that extends from the attachment face inwards and especially goes through the first building layer.

A second object 2 has a sheet portion 21 and in the depicted configuration is for example a metal sheet. A protruding section 23 extends through the mouth of the opening and extends through the first building layer. The protruding section is for example formed by a plurality of tabs that are formed by punching the sheet portion. The tabs are bent downwards away from the sheet portion plane, for example by a dedicated tool (previously of bringing the first and second objects together or thereafter) and/or by introducing the connector 3 into the opening 15.

Especially, it is advantageous if the protruding section is bent away from the sheet portion plane only to an extent that it still provides some resistance when the connector is introduced, at least during the step of causing energy to impinge.

The connector 3 consists of a thermoplastic material and has a stepped head portion 31 and a shaft portion 32 extending distally from the head portion. The shaft portion in the depicted embodiments ends in a distal tip 33. The length of the connector (its proximodistal extension in the depicted configuration) is greater than a cumulated thickness of the first building layer 11 and the interlining 13 so that when it abuts against the inner face of the second building layer 12 it still protrudes above the mouth of the opening. A sonotrode 6 is used to couple mechanical vibration and a pressing force into the connector to anchor the connector in the assembly of the first and second objects and secure the second object to the first object. A counter force to the pressing force is exerted by a support 7, for example a non-vibrating support. The joint effect of the vibration and the pressing force is that a portion of the thermoplastic material becomes flowable and is pressed into structures around the connector 3. Thereby, dimensions of the connector change. After the re-solidification a positive-fit connection results.

Figure 1B:
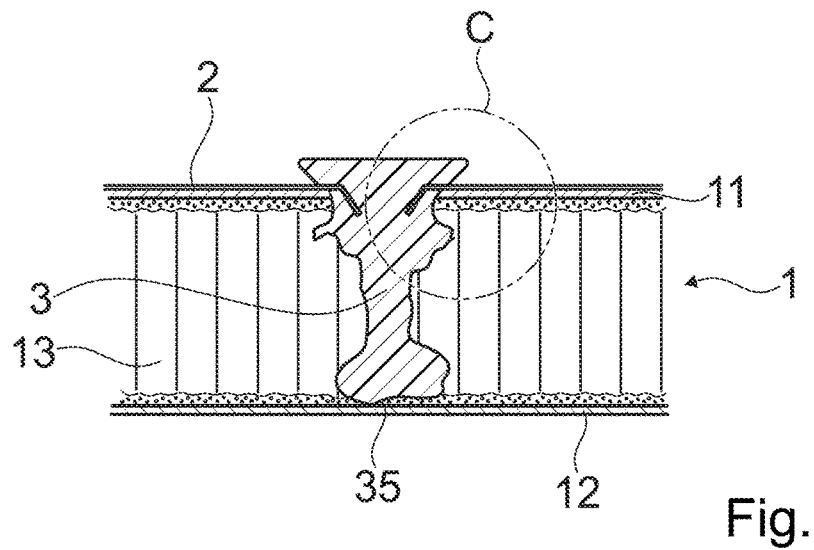
Figure 1C:
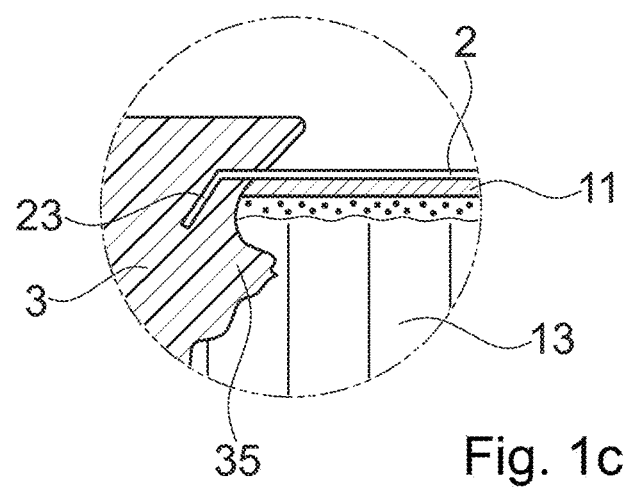

FIG. 1b shows the situation after this step. FIG. 1c illustrates a detail of FIG. 1b showing the region C in FIG. 1b. The flow portion of 35 the thermoplastic material that has re-solidified after the energy input has stopped includes both, parts at the distal end and parts in a proximal region. The flow portion by having interpenetrated structures of the first object—for example the porous foam or hollow spaces formed in the space of the interlining or also a porous structure or inhomogeneity of the first and/or second building layer (if any)—anchors the connector in a positive-fit manner. Moreover, the flow portion 35 by having flown around the protruding section 23 retains the position of the protruding section 23.

Figure 2:
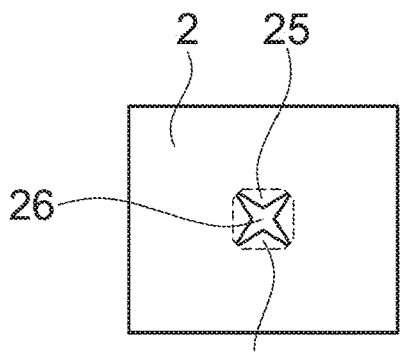
FIGS. 2-4 examples of protruding sections of second objects in top views (views from the proximal side)

FIG. 2 shows a top view on a part of a second object 2 with a protruding section formed by a plurality of tabs 25 formed by punching the sheet portion of the second object in a cross-like or star-like manner and then bending the resulting tabs downwards to yield a star-like opening 26 that in the process will be aligned with the opening 15 of the first object and through which the connector can be pushed.

Figure 3:
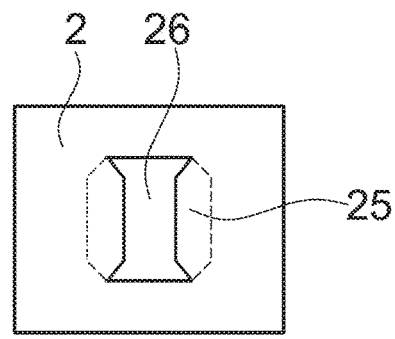
Figure 4:
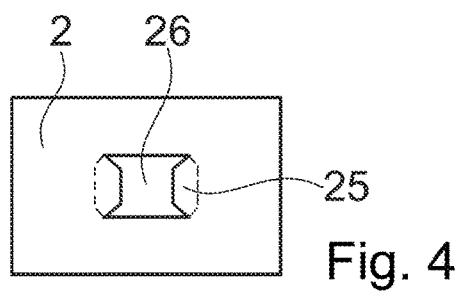
Figure 5:
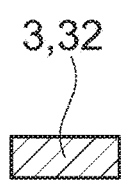
FIG. 5 a cross section of a connector that does not have circular symmetry.

An alternative configuration with a protruding section of essentially rectangular tabs 25 is shown in FIG. 3. Such tabs may be formed by an H-shaped punch and then deforming the resulting tabs by bending them downward. In the variant of FIG. 4, the opening 26 after fully bending the tabs downward is not round or quadratic but rectangular and elongate. Also the shape of the connector 3 may be chosen correspondingly, for example by a shaft portion 32 having a corresponding cross section.

More in general, the approaches according to the current invention are not only suitable for configurations with connectors having circular symmetry (in contrast to for example screwed connections) but to connectors and according openings of any shapes, including but not limited to rectangular, oval, T-bar shapes, double T-bar shapes. H-shapes, etc.

Figure 6A:
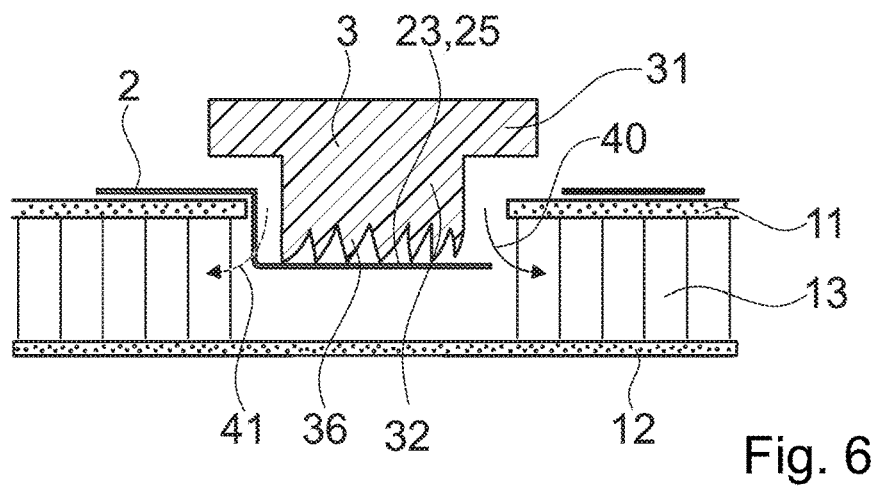
FIGS. 6a and 6b a further configuration of a first object, a second object and a connector during two different stages of a process of securing the second object to the first object.
Figure 6B:
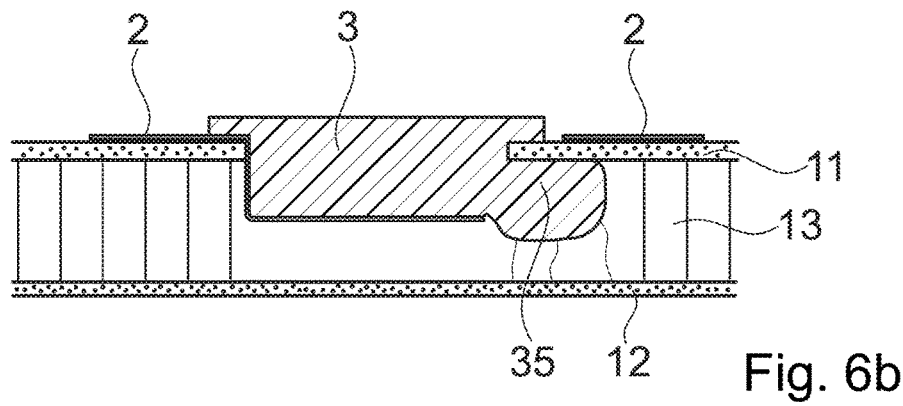

A further variant is shown in FIG. 6a. The embodiment of FIGS. 6a and 6b is an example of the group of embodiments in which a distal end of the connector does not have to reach to the second building layer 12 and that therefore is also suited for configurations in which the first object is not a sandwich board or in which the second building layer 12 cannot or must not resist a pressing force. Rather, in this group of embodiments, the protruding section 23 also serves as counter element/support for the process of making the thermoplastic material flowable by the impact of the vibrations and the pressing force. The protruding section 23 is formed by a tab 25 that is offset towards the distal side with respect to the sheet portion. The material—for example metal sheet material—of the second object 2 at least on the region of the tab 25 is sufficiently stiff for providing sufficient resistance to the pressing force when the connector 3 is pressed to the distal side into the opening while the energy impinges.

In the depicted configuration, the connector consists of thermoplastic material and includes distal energy directors 36. For the process, energy is coupled into the connector, for example by a sonotrode that also exerts the pressing force, until the flow portion becomes flowable and is displaced by the pressing force. The arrow 40 illustrates one of the possible flow direction, the dotted arrow 41 a possible additional flow through an optional opening in the tab 25 (see further below). FIG. 6b shows the situation after the process. The flow portion 35 locks the protruding section 23 with respect to the first object, especially by having flown underneath the first building layer 11.

Figure 7:
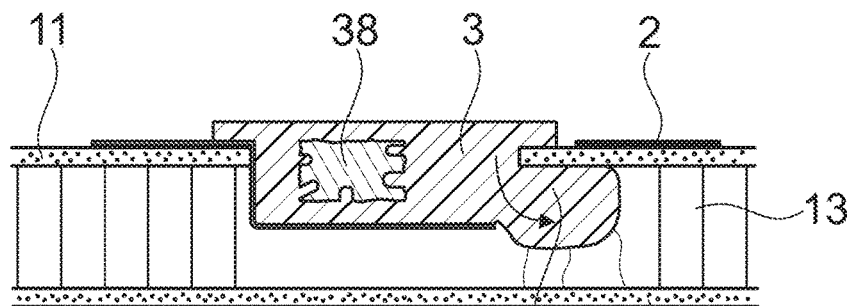
FIG. 7 yet another configuration of a first object, a second object and a connector, illustrated at the end of the process.

A variant with a different connector is yet shown—after the process—in FIG. 7. In contrast to the previously described embodiments, the connector 3 does not consist of the thermoplastic material but includes a body, such as a core 38, of a material that is not liquefiable.

In the depicted embodiment, the core has a plurality of locking features of the above-discussed kind in the form of indentations. In addition to indentations or as an alternative thereto, the surface could also include other features suitable of causing a form locking between the core and the thermoplastic material around it, for example protrusions, an open porosity, or similar. These form locking features may initially be embedded in the thermoplastic material (in the depicted example by the indentations being filled with thermoplastic material) or they can be filled only during the process by the temporarily liquefied thermoplastic material. The form locking features stabilize the core 5 within the thermoplastic material and hold it in place.

In embodiments, the indentations or ridges run into circumferential directions so as to assist the stabilization with respect to axial forces. This may especially be advantageous if after the process the core is accessible from the proximal or distal side for fastening some other item thereto.

Further, the metallic core has a distal guiding indentation.

A metallic body, for example a metallic core (or a core/body of an other not liquefiable material) is an option that exists not only for the configuration of FIGS. 6a/6b as illustrated in FIG. 7 but for all configurations that are within the scope of the present invention, including all discussed and all depicted embodiments.

Figure 8:
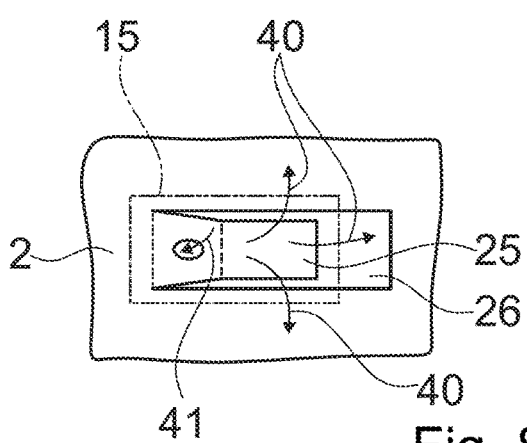
FIG. 8 a top view of a second object illustrating the material flow.

FIG. 8 illustrates, in a top view on a part of the second object 2 (also illustrating, by dashed lines, the position of the opening 15 of the first object) the material flow of the thermoplastic material during the process. The arrows 40 illustrate that the thermoplastic material may flow in three in-plane directions, namely forward (with respect to an orientation of the tab) as well as sideways. If the tab further includes an opening, also a "rearward" flow 41 is possible.

Figure 9:
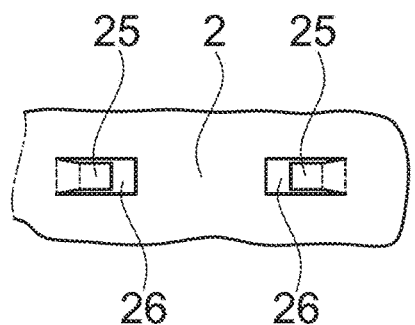
FIG. 9 a top view of a second object with two protruding sections.

The securing brought about by a connection as shown in FIGS. 6-8 is asymmetric in that relative shearing forces in the different in-plane directions are taken up by different geometries. It is, however, possible to provide a plurality of locking places, each including a protruding section, and to use different kinds of protruding sections for this to compensate potential asymmetries. This is for example illustrated in FIG. 9 showing two protruding sections, each with one tab 25, the tabs being oriented in opposite directions. Because in contrast to prior art mechanical lockings with similar tabs there does not have to be an in-plane movement of the first and second objects with respect to one another, arbitrary relative orientations of the protruding sections are possible.

Figure 10:
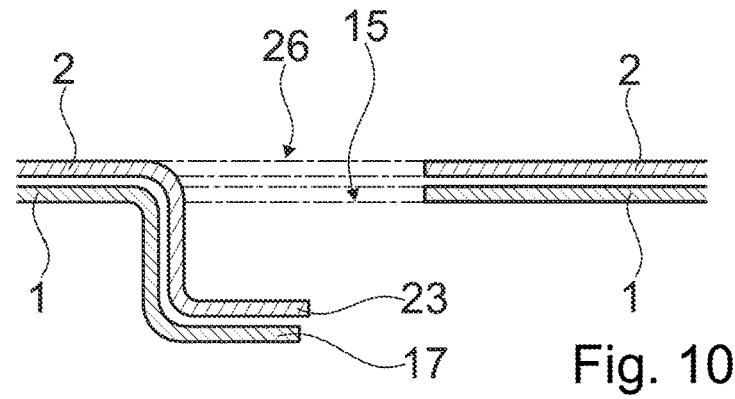
FIG. 10 an alternative configuration of a first object and a second object.

In the embodiment of FIG. 10, in contrast to the previously discussed embodiments the first object 1 is not a sandwich board but an object of a single hard layer, such as a metal sheet, or single laminate of hard layers. The opening 15 in the first object may be punched out and the corresponding material removed. Alternatively, as illustrated, the first object may include a protruding section 17 also.

The process of mechanically securing the second object to the first object may be analogous to the process described hereinbefore referring to FIGS. 6-9. In addition, optionally a support preventing the protruding section 17 of the first object may be present if the mechanical strength of the first and second objects is not sufficient to withstand the pressing force.

Figure 11:
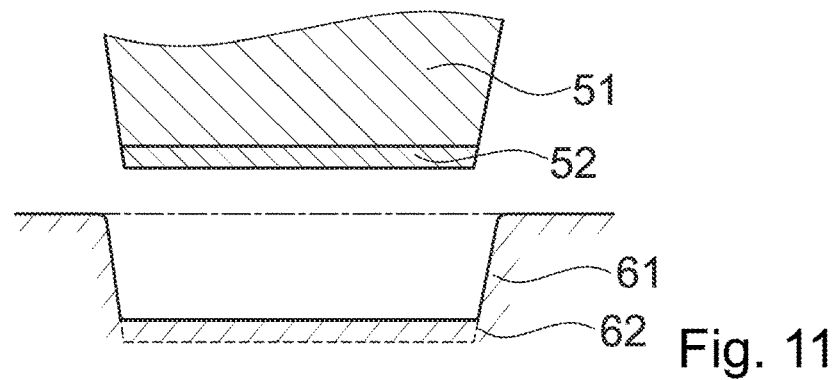
FIG. 11 an arrangement for carrying out a deformation and optionally a punching step of the second object or of an arrangement of a first and a second object.

FIG. 11 illustrates a possibility of carrying out a deformation step or a combined punching and deformation step, either for a first object, or for an assembly of a first and a second object that are both deformed into a configuration as in FIG. 10 simultaneously. To this end, a deformation tool 51 that cooperates with a deformation mold 61 is provided. To form the protruding section 23 or protruding sections 17, 23, the corresponding sheet portion is placed between the deformation tool 51 and the deformation mold 61, and then these are pressed against each other. According to an option, the deformation tool may include a punching edge 52 and the deformation tool a corresponding groove 62 for accommodating the punching edge, so that the punching step and the deformation step may be carried out simultaneously.

According to an even further possibility, the sonotrode may be used for carrying out the deformation step, either by directly on the surface of the second object 2 or via the connector 3 that presses the corresponding sections into the mold to yield the protruding sections (prior to the energy impinging and/or thereafter).

It is even possible that the sonotrode carries out all of the punching step, the deformation step and the anchoring step.

FIG. 12 yet shows a configuration similar to the one of FIGS. 1a-1c wherein the second object 2 is a metal frame, with the sheet portion 21 being a portion of the metal frame. The three panels of FIG. 12 show steps of the process, (from left to right), namely a step of positioning the first and second objects 1, 2 and the connector 3 relative to one another, the onset of the mechanical vibrations (i.e. the initial stage of the energy impinging on the connector), and the stage at which the mechanical vibrations and the pressing force are stopped, respectively.

In the left panel of FIG. 12, the first building layer 11 is illustrated without an opening. Depending on its material properties, it is an option to not pre-manufacture the opening but to manufacture it by pressing the second object's protruding section and/or the connector into it. In accordance with an alternative working for almost all first building layer material compositions, however, the opening may be pre-made.

In the middle panel of FIG. 12, a step 34 of the stepped head is shown to cooperate with the protruding section 23 so that at the mutual contact of the protruding section and the connector thermoplastic material is liquefied, similarly to what is illustrated in FIG. 1c.

Both, the option of manufacturing the opening by pressing the protruding section and/or connector into the first object and the option of having a step feature (or a pronounced taper) cooperating with the protruding section to liquefy material do not only apply to the embodiment of FIG. 12 but to all embodiments where this is possible.

FIG. 7 also illustrates a local non-vibrating support 7 (or anvil) that forms a supporting surface vis-à-vis the spot against which the connector is pressed, i.e. distally of this spot.

FIG. 13a further shows a further example of a metal frame as a second object. In this embodiment, the protruding section 23 is not a tab attached on one side only but forms a closed bow protruding on the distal side. Such a shape brings about additional stability.

FIGS. 13b and 13c show the second object 2 placed on the attachment face of the first object, wherein the first building layer 11 is made of a glass fiber composite. FIG. 13b illustrates the situation prior to the anchoring of the connector, and FIG. 13c shows the situation thereafter.

As seen in FIG. 13c, the connector has a proximal indentation extending axially from the proximal end. Such indentation may serve as a guiding feature and cooperate with an according guiding protrusion of the sonotrode. This feature is again an option for all embodiments described in this text.

Figure 14:
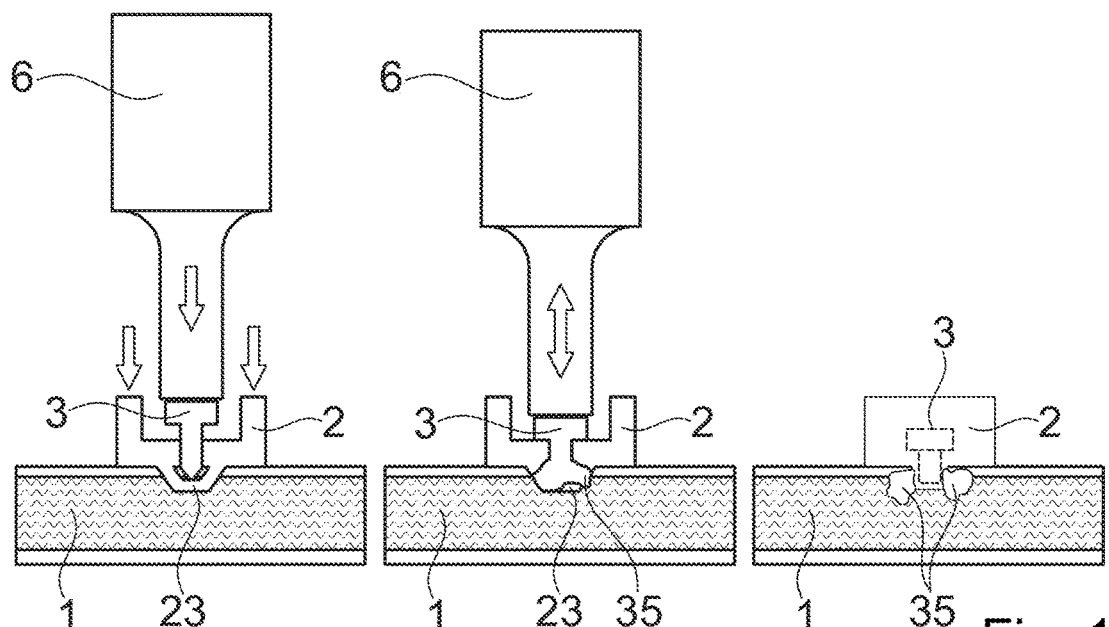

FIG. 14 shows the configuration with the second object the protruding section of which is a closed bow. The left panel shows the step of pressing the second object and the connector into the first object (with or without a pre-manufactured opening), and the middle panel shows the step of making the flow portion flowable towards the end of this step. The right panels shows the configuration of the middle panel without the sonotrode in a lateral view (turned by 90°) to illustrate that the thermoplastic material flows out underneath the top layer, sideways with respect to the direction of the bow.

Like any other embodiments in which there is no need for a second building layer against which the connector is pressed, the configuration of FIG. 14 is suitable also for securing the second object (metal frame for example) to a different first object than a sandwich board.

Figure 15A:
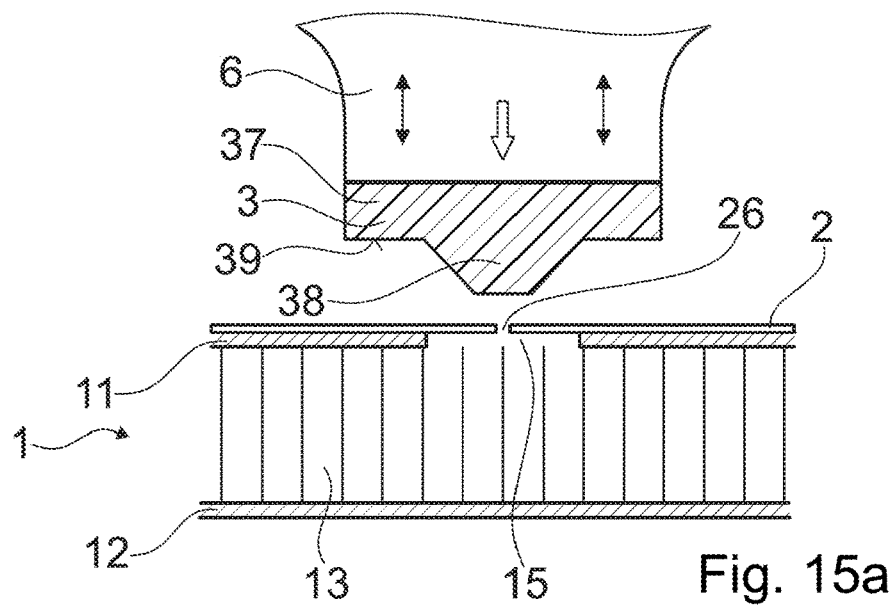
FIGS. 15a and 15b a further configuration of a first object, a second object and a connector during two different stages of a process of securing the second object to the first object.

The connector 3 of FIG. 15a is suited to secure a second object 2 with a sheet portion to a sandwich board 1 or other object including at least one building layer of a material with some dimensional stiffness. The connector includes a main body 37 and a distally protruding anchoring portion 38. The second object may, depending on the material strength of the sheet portion, be provided with an opening 26, for example formed as a slit, a cross, (both optionally as punching lines) or similar. The first object 1 includes an opening 15 to which the second object opening 26 is approximately aligned when the second object 2 is placed to be in physical contact with the proximally facing surface of the first object (of course, it would be possible to place an object, such as a foil or the like, between the first and second objects in addition).

Figure 15B:
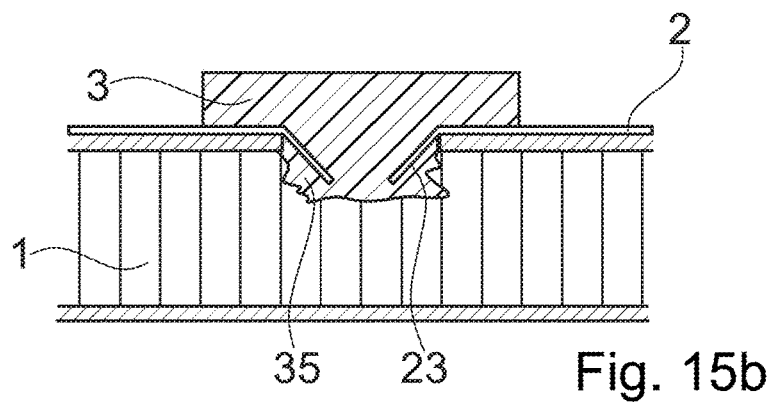

The connector in the process is first pressed against the assembly of the first and second objects with the protruding anchoring portion 38 pressing against the second object at the location of the opening 15 so as to deform a portion of the sheet material to yield a protruding section 23 (FIG. 15b). At the same time, or thereafter, the mechanical vibrations are coupled into the connector while the pressing force is maintained, until thermoplastic material of the anchoring portion 38 becomes flowable and forms the flow portion 35. The distally facing surface 39 of the main body 37 forms an abutment face limiting the movement of the connector relative to the first object so that the energy input may stop as soon as it is in contact with the corresponding proximally facing surface of the second object.

Figure 16:
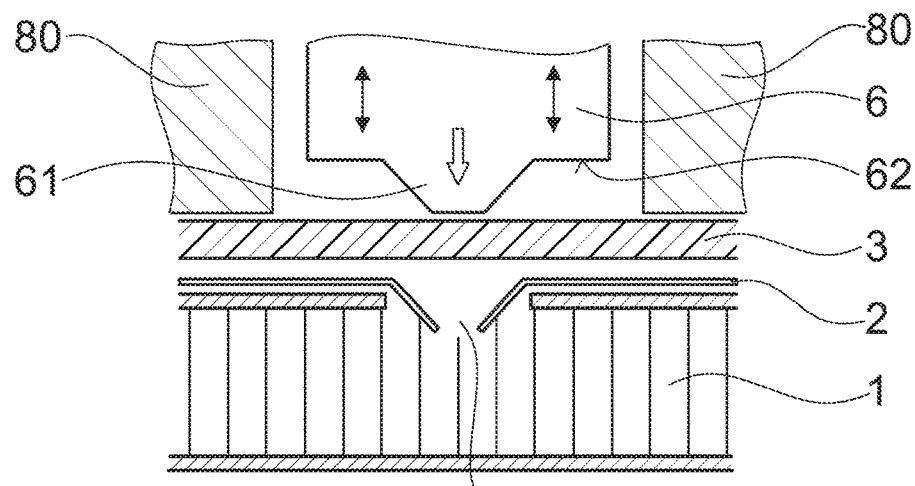
FIG. 16 yet another configuration of a first object, a second object and a connector.

An alternative to this configuration is shown in FIG. 16. In FIG. 16, the connector 3 is itself thermoplastic, essentially flat and for example sheet-like. The sonotrode is provided with a protruding section 61 that during the process causes a local deformation of the connector 3 and consequently causes the thermoplastic material to be pressed against material of the sheet portion while the mechanical vibration energy impinges.

The sonotrode also forms a stop face 62 limiting the movement of the sonotrode into the material of the connector and thereby defining the degree of deformation and material displacement.

FIG. 16 further illustrates press pads 80 that have the function of preventing the sheet-like material to bulge laterally of the position where the protruding section is pressed against the connector 3. Such press pads may—depending on materials and parameters—also be used in other embodiments, such as the embodiment of FIGS. 15a and 15b.

Figure 17A:
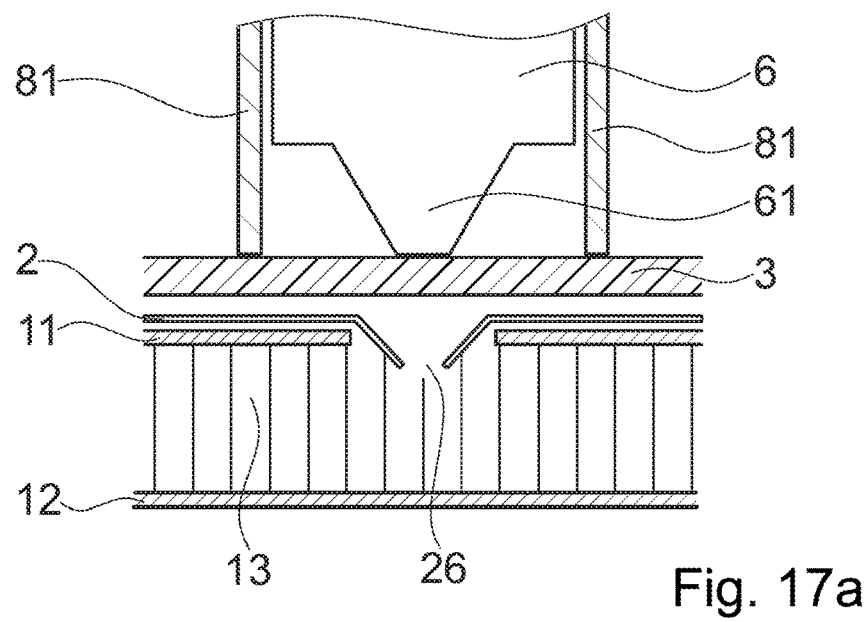
FIGS. 17a and 17b an even further configuration of a first object, a second object and a connector during two different stages of a process of securing the second object to the first object.

FIG. 17a shows an arrangement similar to the one of FIG. 16. In addition or as an alternative to the press pads, a lateral flow confiner 81 (which for example also may be constituted by a press pad sufficiently close to the sonotrode 6) is provided. Like in the embodiment of FIG. 16, the protruding section of the second object is illustrated to be bent downwardly (i.e. towards the distal side) only slightly. In contrast to what is shown in these figures, the protruding section may be such as to not protrude distally at all before the process starts.

The pressing of the sonotrode 6 with the protruding section 61 into the connector material while mechanical vibrations act on will result in a deformation of the connector 3, as a result in a (further) deformation of the second object (the protruding section is further bent towards distally), in addition to the flow portion becoming flowable and flowing laterally, including a flow in the direction of the arrows (liquefaction will primarily set in at the interface between the connector and the second object). A certain backward flow (bulges around the depression 139 caused by the protruding section) may occur also, whereas the flow confiner impedes a lateral flow proximally of the second object.

A material thickness of the thermoplastic connector may be lower distally of the depression than it was initially, due to the material portions that have flown to into lateral directions and possibly backwardly.

Figure 17B:
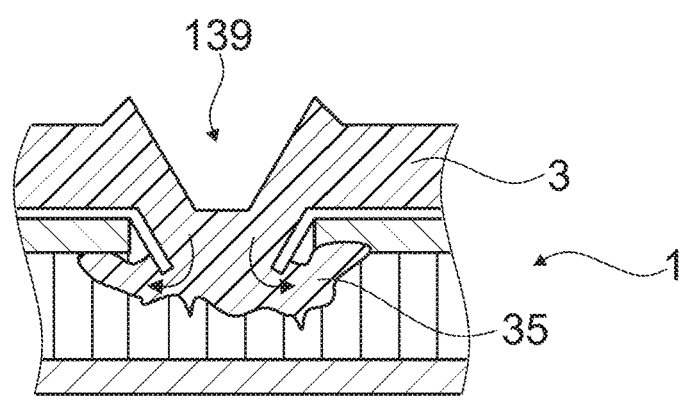
Figure 18:
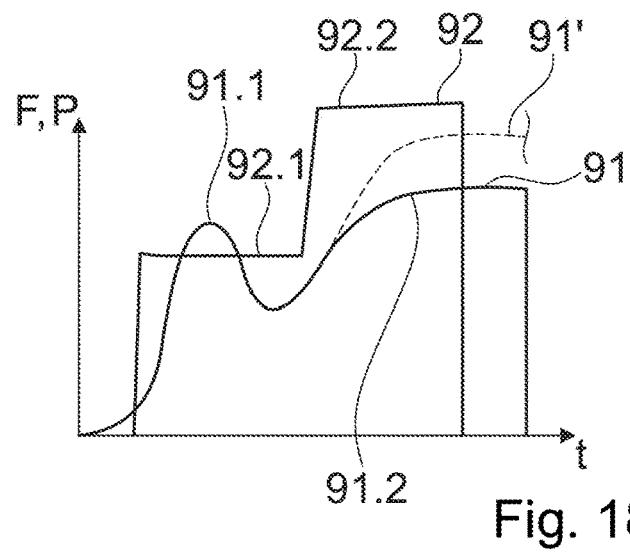
FIG. 18 a process diagram.

FIG. 18 depicts an example of a process diagram, with the pressing force 91 and the vibration power 92 depicted as functions of the time t. In the example of FIG. 18, it is assumed that like for example in the embodiments of FIG. 12 (without pre-made opening) and FIGS. 15a-17 and embodiments described hereinafter an initial deformation step takes place. During this deformation step, the pressing force may reach a first peak 91.1, whereafter is reduced a bit. Then, while the mechanical vibration energy is coupled into the set-up for liquefying the thermoplastic material, the pressing force is raised again (second peak 91.2). The pressing force is maintained also after the thermoplastic vibrations are switched off, until the flow portion has sufficiently re-solidified.

In the depicted embodiment, mechanical vibrations act already during the deformation stage, to assist the deformation and possibly to soften the thermoplastic material (especially if, like in FIGS. 16-17 and embodiments described hereinafter, the thermoplastic material has to be deformed). This is optional.

The dashed line 91' illustrates the possibility that the pressing force can go up to rather high values of additionally an anvil 7 (non-vibrating support directly at lateral locations where the connector is pressed against the first/second object) is used, for example, but not only, in situations where, like in the embodiment of FIG. 12, the first object is also anchored distally of the protruding section of the second object.

Figure 19:
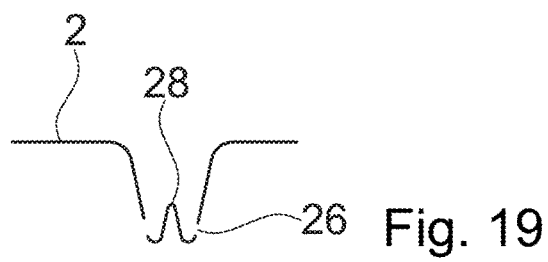
FIG. 19 a second object that forms an energy director.

FIG. 19 illustrates an optional feature that applies as an option to all embodiments described in this text hereinbefore. Namely, the second object, at locations where it comes into contact with the thermoplastic material during the process, is provided with at least one energy directing structure 28. Such energy directing structure may be provided in the form of a deformation of the metal sheet portion, if the second object includes such metal sheet portion.

Especially, such energy directing portions may be located where during the process the second object creates a counter force to the pressing force by which the connector is pressed against it.

The energy structure 28 in FIG. 19 together with the location of the openings 26 has a double function. In addition to serving as energy director, as explained, it also serves for distributing the flow of the flow portion in a targeted manner. Due to the structure of the second object, for example, the flow portion will flow out to both/all lateral directions (to the left and to the right in FIG. 19) even if the strength of material to be penetrated by the flow portion is not equal on both sides and if therefore the flow portion without flow direction means would flow towards one side (the one with less resistance) only.

More in general, structures formed out of the second object material may either serve as energy directors, as flow directors, or both, as energy directors and flow directors. The second object may one of them (energy director (s), flow director(s), combined energy director(s) and flow director(s)) or any combination of them.

Figure 21:
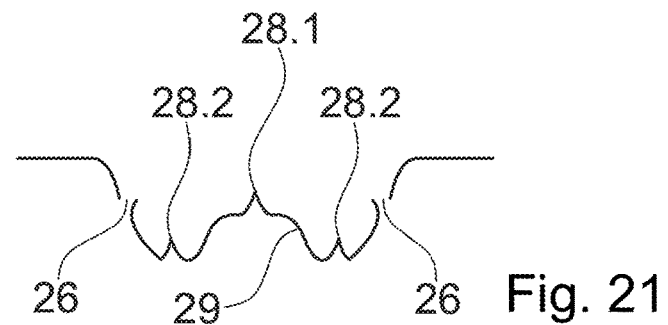
FIG. 21 an other second object that forms a plurality of energy directors and flow directors.

This is schematically illustrated also in FIG. 21 where the second object is illustrated to have a first energy director 28.1 that also has flow directing properties, second energy directors 28.2 that are located so that they do not have substantial flow directing properties, as well as a flow director 29 (formed by a broad central bulge) that does not have substantial energy directing properties.

In FIG. 21, also the sheet portions immediately distally of the openings 26 have energy directing and flow directing properties in that they are pointed towards the proximal direction from which the connector will be pressed against the second object.

A difference between the first energy director 28.1 and the second energy directors 28.2 is their axial position (position along the proximodistal axis). The second energy directors are located substantially distally of the openings 26 that form outflow channels, whereas the first energy director 28.1 as well as the bulge 29 extend to axial positions in which they separate portions directed to one channel (for example the left opening in FIG. 21) from portions directed to another channel (for example the right opening in FIG. 21) when the connector material is pressed against the second object from a generally proximal direction, with distal portions thereby made flowable.

Figure 20:
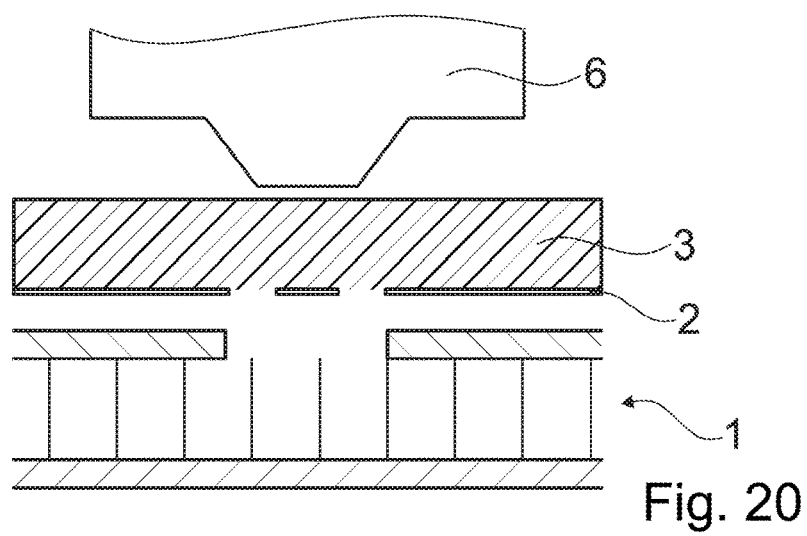
FIG. 20 an embodiment in which the second object and the connector together form a unit.

FIG. 20 shows a variant of the embodiments of FIGS. 16 and 17a, in which the second object 2 and the connector 3 together form a unit by being fixed to each other initially. The unit is formed by a laminate of the thermoplastic connector 3 forming a first layer and a metal sheet as second object 2 forming a second layer. The second object may be provided with second object opening(s) as described hereinbefore.

What is claimed is:

1. A method of securing a second object to a first object, the method comprising the steps of:
   providing the first object comprising an attachment face;
   providing the second object with a generally flat sheet portion;
   providing a connector, the connector comprising a thermoplastic material in a solid state;
   placing the second object relative to the first object so that the sheet portion lies against the attachment face and a protruding section of the sheet portion extends into an opening of the first object, the opening having a mouth in the attachment face, the protruding section extending through the mouth into the opening, the protruding section does not extend all the way through the first object, an edge formed by the protruding section is located within the first object;
   while the protruding section extends into the opening, causing energy to impinge on the connector while the connector is placed relative to the first and second objects and extends through the mouth into the opening, until a flow portion of the thermoplastic material becomes flowable and flows relative to the first object and relative to the protruding section so as to cause at least the edge to become embedded in material of the flow portion; and
   causing the flow portion to resolidify;
   wherein the resolidified flow portion embedding the edge locks the protruding section relative to the opening.

2. The method according to claim 1, comprising the further step of manufacturing the opening prior to the step of placing or comprising using a pre-made opening.

3. The method according to claim 1, wherein the opening is at least in part manufactured by the step of placing the second object relative to the first object or by placing the connector relative to the first and second objects.

4. The method according to a claim 1, wherein the protruding section is a deformed section one-piece with the sheet portion and formed by deforming a corresponding section of the sheet portion to distally protrude from a sheet portion surface.

5. The method according to claim 4, wherein the protruding section comprises one or more tabs bent away from the sheet portion.

6. The method according to claim 4, wherein the protruding section comprises a closed bow looping away from the sheet portion.

7. The method according to claim 1, wherein the second object comprises a second object opening in a vicinity of the protruding section, so that the connector is capable of reaching through the second object opening into the opening of the first object and thereby being in contact with the protruding section.

8. The method according to claim 1, wherein the energy is mechanical vibration energy.

9. The method according to claim 8, wherein the connector comprises a coupling-in structure, and wherein the method comprises pressing a vibrating sonotrode against the coupling-in structure during the step of causing energy to impinge.

10. The method according to claim 9, wherein the coupling-in structure comprises a proximally-facing coupling-in face.

11. The method according to claim 8, wherein the second object comprises an energy director, and wherein in the step of causing energy to impinge on the connector while the connector is placed relative to the first and second objects, the connector is in physical contact with the energy director.

12. The method according to claim 11, wherein the energy director is a deformed section of the second object.

13. The method according to claim 11, wherein the energy director is located in the protruding section and belongs to the protruding section.

14. The method according to claim 1, wherein the first object comprises a portion that is penetrable by the thermoplastic material, and wherein the step of causing the flow portion to flow comprises causing material of the flow portion to penetrate into the penetrable portion, whereby, after re-solidification, a positive-fit connection between the connector and the first object is achieved.

15. The method according to claim 1, wherein the step of causing the flow portion to flow comprises causing material of the flow portion to flow distally of a building layer of the first object that comprises the attachment face.

16. The method according to claim 1, wherein the sheet portion of the second object comprises a metal sheet.

17. The method according to claim 1, wherein the first object comprises a sandwich board comprising a proximal outer building layer, a distal outer building layer, and an interlining between the building layers, wherein the interlining is of a material that is softer and/or more lightweight than a material or materials of the proximal and distal building layers.

18. The method according to claim 17, comprising pressing a distal end of the connector against an interior surface of the distal building layer during the step of causing energy to impinge.

19. The method according to claim 18, wherein causing the flow portion to flow comprises causing flowable material to penetrate into structures of the distal building layer and/or into structures that are proximally of the distal building layer and adjacent thereto.

20. The method according to claim 1, wherein the first object is a metal sheet or a laminate of dimensionally stiff layers.

21. The method according to claim 1 and comprising the step of deforming a part of the first object to yield a first object protruding section, the first object protruding section protruding on a distal side from a first object sheet surface.

22. The method according to claim 21, comprising deforming the part by pressing the part by a deformation tool against a distal side until the part abuts against a deformation mould.

23. The method according to claim 22, wherein the deformation tool or the deformation mould or both comprises/comprise a punching edge.

24. The method according to claim 21, comprising deforming a part of the second object to yield the protruding section simultaneously with deforming the part of the first object.

25. The method according to claim 21 comprising using a sonotrode for deforming.

26. The method according to claim 1, wherein the connector consists of the thermoplastic material.

27. The method according to claim 1, wherein the connector in addition to the thermoplastic material comprises a body of a not liquefiable material.

28. The method according to claim 27, wherein the steps of placing and of causing the flow portion to flow are carried out such that during the step of causing the flow portion to re-solidify, the body extends through a shear plane between the attachment face and the sheet portion.

29. The method according to claim 1, wherein the connector comprises a shaft portion and a proximal head proximally thereof, a distally facing abutment face of the proximal head abutting, after causing the flow portion to resolidify, against a proximal face of the sheet portion in a region around the opening.

30. The method according to claim 1, wherein the protruding section is shaped such as to provide at least some resistance against introducing a shaft portion of the connector into the opening.

31. The method according to claim 1, wherein the flow portion has a liquefaction temperature of 250° C. or less.

32. The method according to claim 1, comprising the step of generating the protruding section by deforming a portion of the second object by a pressing force while the second object is placed relative to the first object.

33. The method according to claim 1 and comprising making the opening of the first object by pressing the protruding section of the second object against a surface of the first object.

34. The method according to claim 1, wherein the connector has a main body with a generally flat distally facing abutment face and a protruding portion protruding distally from the main body.

35. The method according to claim 1, wherein the connector has a thermoplastic sheet portion, and wherein the method comprises deforming the thermoplastic sheet portion by a pressing force pressing material of the sheet portion distally into the opening.

* * * * *